(12) United States Patent
Lee et al.

(10) Patent No.: US 8,900,543 B2
(45) Date of Patent: Dec. 2, 2014

(54) SEPARATION OF TELLURIUM BY SOLVENT EXTRACTION METHOD

(71) Applicants: Korea Institute of Science and Technology, Seoul (KR); Recytec. Inc., Gyeonggi-Do (KR)

(72) Inventors: Hwa Young Lee, Seoul (KR); Joong Kee Lee, Seoul (KR); Jae Gyu Jee, Gyeonggi-Do (KR); Joon Chul Choi, Gyeonggi-Do (KR)

(73) Assignees: Korea Institute of Science and Technology, Seoul (KR); Recytec. Inc., Gyeonggi-do (KR)

( * ) Notice: Subject to any disclaimer, the term of this patent is extended or adjusted under 35 U.S.C. 154(b) by 0 days.

(21) Appl. No.: 13/922,380

(22) Filed: Jun. 20, 2013

(65) Prior Publication Data

US 2014/0112860 A1    Apr. 24, 2014

(30) Foreign Application Priority Data

Oct. 23, 2012 (KR) .................. 10-2012-0118091

(51) Int. Cl.
*C01B 19/00* (2006.01)

(52) U.S. Cl.
CPC .............. *C01B 19/001* (2013.01); *C01B 19/00* (2013.01)
USPC ......................................... 423/508; 423/510

(58) Field of Classification Search
CPC ........ C01B 19/00; C01B 19/001; C01B 19/02
USPC .................................... 423/508, 510
See application file for complete search history.

(56) References Cited

U.S. PATENT DOCUMENTS 3,387,928 A * 6/1968 Doumas ......................... 423/509
3,390,090 A * 6/1968 Taylor et al. ........... 252/62.3 Z T
4,293,332 A   10/1981 Wang et al.
5,939,042 A * 8/1999 Stafiej et al. .................. 423/508
6,126,720 A   10/2000 Okada et al.
7,479,262 B2 * 1/2009 Okada et al. .................... 423/22

FOREIGN PATENT DOCUMENTS

| JP | 10259430 A    | 9/1998  |
| JP | 2001207223 B1 | 9/2000  |
| JP | 3826603 B2    | 9/2006  |
| JP | 2006265677 A  | 10/2006 |

OTHER PUBLICATIONS

V. Andruch, et al; "Investigation of the Extraction of Tellurium Complexes with Basic Dye Reagents", Chem. Pap, vol. 57, Issue 5, pp. 332-334; 2003; No exact date found researching web sites.
Runu Chakraborty, et al; "Extraction of Te(IV) by liquid surfactant membrane", Hydrometallurgy, vol. 43, Issues 1-3, Nov. 1996, pp. 169-174.
Korean Office Action dated Apr. 22, 2014; Appln. No. 10-2012-0118091.
Korean Notice of Allowance Issued Sep. 23, 2014; Appln. No. 10-2012-0118091.

* cited by examiner

*Primary Examiner* — Timothy Vanoy
(74) *Attorney, Agent, or Firm* — Ladas & Parry LLP

(57) ABSTRACT

A method for separating tellurium includes separating and recovering tellurium (Te) from a dissolved solution containing the tellurium using a solvent extraction by an extractant, which contains one selected from a group consisting of tributyl phosphate (TBP), tris(2-ethylhexyl) phosphate (TEHP) and a combination thereof. The method may separate and recover the tellurium as a high-priced metallic element from a material, such as a $Bi_2Te_3$-based waste thermoelectric material, which contains not only the tellurium but also other metallic elements, simply and economically using a solvent extraction, whereby the tellurium with high yield and high purity can be separated, recovered and recycled.

17 Claims, No Drawings

SEPARATION OF TELLURIUM BY SOLVENT EXTRACTION METHOD

CROSS-REFERENCE TO RELATED APPLICATION

Pursuant to 35 U.S.C. §119(a), this application claims the benefit of earlier filing date and right of priority to Korean Application No. 10-2012-0118091, filed on Oct. 23, 2012, the contents of which is incorporated by reference herein in its entirety.

BACKGROUND

1. Field

This specification relates to separating and recovering of high purity tellurium (Te) for recycle which is a high-priced metallic element, from a solution in which a material containing tellurium such as a thermoelectric material containing $Bi_2Te_3$ is dissolved, using a solvent extraction method.

2. Background

Thermoelectric materials are a type of semiconductor material, which has a function of converting electric energy into thermal energy or thermal energy into electric energy.

With improvement of income levels, demands on refrigerating and cooling drinking water or various types of daily necessaries are highly increasing in hot humid summer weather like South Korea. To meet such expectations, supply of electric home appliances such as a hot and cold water dispenser and a small refrigerator are remarkably increasing around us. An essential component for electric home appliances having the refrigerating and cooling function is a thermoelectric module which can move heat from one side to other side by receiving electric energy.

Among those thermoelectric materials, $Bi_2Te_3$ is used the most widely. It is known that the thermoelectric material has a lifespan of about 10 years. Tellurium (Te) which is an element of the thermoelectric material $Bi_2T_3$ is one of very rare metals and thus is very expensive. Therefore, it is necessary to recycle the tellurium from a waste thermoelectric module.

When the waste thermoelectric module is dissolved with hydrochloric acid, nitric acid or combination thereof for recycle, the solution may contain small amounts of Cu, Ni, Sn and Sb in addition to Bi and Te. Therefore, in order to recover tellurium as a high purity metal from the acidic solution, it may be first carried out to separate the tellurium from the other metallic elements.

As widely known, a separation of metallic elements from an aqueous solution may be carried out by precipitation, ion exchange, solvent extraction and the like. Among others, the precipitation method has an advantage in low cost but also has a difficulty in a high degree of separation of each metallic element. Also, the ion exchange method uses a cation-exchange resin or an anion-exchange resin so as to very effectively separate the metallic elements from the aqueous solution, but also has disadvantages in a high price of the anion-exchange resin and a low separation speed.

Therefore, the present disclosure proposes a solvent extraction method for recycling tellurium by separating the tellurium from a solution, which is obtained by dissolving a $Bi_2Te_3$-based waste thermoelectric module, in a very effective and economical manner.

SUMMARY

Therefore, an aspect of the detailed description is to separate and recover, for recycle, high purity tellurium (Te) as a high-priced metallic element from a solution, which is obtained by dissolving a material containing the tellurium, such as a waste thermoelectric material containing $Bi_2Te_3$, using a solvent extraction method.

To achieve these and other advantages and in accordance with the purpose of this specification, as embodied and broadly described herein, there is provided a method for separating tellurium according to one exemplary embodiment, the method comprising a procedure of separating and recovering tellurium (Te) from a dissolved solution containing tellurium with a solvent extraction by an extractant, which may contain one selected from the group consisting of tributyl phosphate (TBP), tris(2-ethylhexyl) phosphate (TEHP) and a combination thereof.

The dissolved solution may contain hydrochloric acid.

The solvent extraction may comprise steps of: (1) preparing an extraction crude solution by mixing hydrochloric acid with the dissolved solution and mixing the extraction crude solution with the extractant as an organic phase so as to prepare a first extract solution containing metallic elements extracted from the dissolved solution; (2) mixing the first extract solution with a hydrochloric acid solution to prepare a second extract solution as an organic phase, which impurities have been removed from the first extract solution; and (3) mixing the second extract solution with water to prepare a recovery solution as an aqueous solution containing tellurium (Te).

In the step (1), the hydrochloric acid may be mixed such that its concentration is in a range of 4 to 10 mol/l within the extraction crude solution.

In the step (1), the extractant may be used in a volume ratio of 0.2 to 5 based on the extraction crude solution.

In the step (2), the hydrochloric acid solution may contain the hydrochloric acid at a concentration of 0.1 to 1 mol/l.

In the step (2), the hydrochloric acid solution may be used in a volume ratio of 0.5 to 2 based on the first extract solution.

In the step (3), the water may be used in a volume ratio of 0.5 or more based on the second extract solution.

The extractant may further contain a dilute solution (diluent). The dilute solution may be an organic solvent which is one selected from the group consisting of kerosene, hexane, benzene, toluene and combinations thereof.

The dissolved solution may be obtained by dissolving the $Bi_2Te_3$-based waste thermoelectric material in strong acid.

The strong acid may be one selected from the group consisting of hydrochloric acid, nitric acid, and combinations thereof.

In the step (3), the second extract solution with the tellurium removed therefrom may be reused (recycled) as the extractant of the step (1).

Hereinafter, the present disclosure is described in more detail.

A method for separating tellurium in accordance with one exemplary embodiment of the present disclosure applies a solvent extraction method using an extractant to separating tellurium. The extractant may contain one selected from the group consisting of tributyl phosphate (TBP), tris(2-ethylhexyl) phosphate (TEHP) and a combination thereof.

Tellurium may be usually applied to a thermoelectric material. The tellurium is a high-priced rare metal and mixed with other metallic elements when being applied to the thermoelectric material. In this case, considering the difficulty in separation and recovery of the tellurium, a dissolved solution containing the tellurium, for example, refers to a solution that a material containing the tellurium, such as $Bi_2Te_3$-based waste thermoelectric material, is dissolved such that the tellurium can be present in an ionic state. However, the tellurium may not be limited to being obtained from the waste thermoelectric material. If any material contains the tellurium, it may be dissolved into a solution to which the tellurium separation method of the present invention can be applied.

The dissolved solution may be obtained by dissolving a material containing tellurium, such as $Bi_2Te_3$-based waste thermoelectric material, in strong acid. Preferably, the strong acid may be one selected from the group consisting of hydrochloric acid, nitric acid, and combinations thereof.

The dissolved solution may contain hydrochloric acid. The solution may be mixed with the hydrochloric acid during the dissolving process or the hydrochloric acid may be separately added into the solution after preparation of the solution.

In order to extract the tellurium from the extraction crude solution using the extractant, the hydrochloric acid should be mixed within the extraction crude solution. The tellurium may not be extracted using the extractant when the extraction crude solution contains other acids except for the hydrochloric acid. Hence, it may be appropriate to use strong acid when using a solution obtained by dissolving the material containing the tellurium, such as $Bi_2Te_3$. But, in order to extract the tellurium from the extraction crude solution containing the dissolved solution using the extractant, the extraction crude solution should be mixed with the hydrochloric acid.

The extractant may be used to recover high purity tellurium at a high recovery ratio and also in an economical manner, in the aspect that it exhibits a great difference in an extraction rate of each metal according to a concentration of the hydrochloric acid which is used while extracting the metals, unlike the typical precipitation or ion exchange method.

The method for recovering the tellurium may comprise steps of (1) preparing an extraction crude solution by mixing hydrochloric acid with the dissolved solution and mixing the extraction crude solution with the extractant so as to prepare a first extract solution, (2) mixing the first extract solution with a hydrochloric acid solution to prepare a second extract solution as an organic phase, which impurities have been removed from the first extract solution, and (3) mixing the second extract solution with water to prepare a recovery solution as an aqueous solution containing tellurium (Te).

When the extraction crude solution containing the hydrochloric acid and the dissolved solution is mixed with the extractant and stirred, metallic ions including the tellurium, which are contained in the extraction crude solution, may be extracted by the extractant. Accordingly, the first extract solution as an organic phase, containing the extracted metallic ions, may be obtained. In the step (1), when the solvent extraction for the dissolved solution is carried out using the extractant, almost all of the tellurium contained in the dissolved solution may be extracted.

The dissolved solution may be contained with other metals, such as antimony (Sb), copper (Cu), tin (Sn), bismuth (Bi) and nickel (Ni), in addition to the tellurium. Here, upon using the extraction process of the step (1), the tellurium and the antimony may be almost all extracted from the dissolved solution, the copper and the tin may be partially extracted, and the bismuth and the nickel may be rarely extracted.

The extraction crude solution may be prepared by mixing the dissolved solution with the hydrochloric acid. The hydrochloric acid may be added its concentration to be in a range of 4 to 10 mol/l within the extraction crude solution. When the concentration of the hydrochloric acid within the extraction crude solution is below 4 mol/l, the tellurium may not be fully extracted. This may result in lowering a recovery ratio of tellurium. Also, when the concentration of the hydrochloric acid within the extraction crude solution exceeds 10 mol/l, the hydrochloric acid may be unnecessarily over-consumed.

The extractant may be used in a volume ratio of 0.2 to 5 based on the extraction crude solution. When the volume ratio of the extractant is lower than 0.2 based on the volume of the extraction crude solution, an extraction ratio of the tellurium may be lowered. When the volume ratio exceeds 5, an excessive cost may be spent for the extractant.

The extractant may further contain a diluent. The diluent may be an organic solvent. Any diluent may be applied if it does not interfere with the extraction. Preferably, the organic solvent may be, but not limited to, one selected from the group consisting of kerosene, hexane, benzene, toluene and combinations thereof.

The extraction process of the step (1) may be realized by putting the extraction crude solution and the extractant into a reactor and violently stirred at room temperature. The stirring may be carried out for about 1 hour but not be limited to this. The stirring time may be appropriately adjusted according to intensity of the stirring and quantities of the extraction crude solution and the extractant. After completion of the stirring, the extraction crude solution and the first extract solution, which is an extractant that metal ions have been extracted from the extraction crude solution, may be left stationarily for phase separation, and then mutually separated from each other.

In the step (2), the first extract solution obtained in the step (1) may be mixed with a hydrochloric acid solution to prepare a second extract solution which impurities (for example, copper, tin, etc.) have been removed from the first extract solution, except for the tellurium. This process may allow for acquisition of tellurium with excellent purity.

In the step (2), the hydrochloric acid solution may contain the hydrochloric acid at the concentration of 0.1 to 1 mol/l. When the concentration of the hydrochloric acid within the hydrochloric acid solution is below 0.1 mol/l or exceeds 1 mol/l, a removal rate of the impurities may be lowered, resulting in deterioration of purity of the recovered tellurium.

The hydrochloric acid solution may be used in a volume ratio of 0.5 to 2 based on the first extract solution. When the volume ratio of the hydrochloric acid solution used is below 0.5 based on the volume of the first extract solution, the impurities may not be fully removed. When the volume exceeds 2, the hydrochloric acid may be unnecessarily over-consumed.

The extraction of the step (2) may be carried out by putting the first extract solution and the hydrochloric acid solution into a reactor to be intensely stirred. The stirring may be carried out for about 1 hour but not be limited to this. The stirring time may appropriately be adjusted according to the intensity of the stirring and quantities of the first extract solution and the hydrochloric acid solution. After completion of the stirring, the second extract solution which the impurities have been removed from the first extract solution and the hydrochloric acid solution which impurities have been extracted from the first extract solution may be left stationarily for phase separation, and then mutually separated from each other.

In the step (3), the second extract solution and the water may be stirred each other to prepare a recovery solution, which is an aqueous solution containing the tellurium, through a back extraction process. Since only the tellurium may remain in the second extract solution with the impurities removed through the step (2), the tellurium contained in the second extract solution may all be recovered by such simple back extraction using the water.

In the step (3), any solvent may be applied instead of the water if it allows for the back extraction of the tellurium from the second extract solution. Here, since it is effective and economical to use the water as the solvent for the back extraction of the tellurium, the water may preferably be used as the back extraction solvent in the step (3).

The volume ratio of the water may be 0.5 or more based on the second extract solution. When the volume ratio of the water is less than 0.5, the back extraction of the tellurium may not be perfectly carried out. The upper limit of the quantity of water used may not be specifically limited, but the water may be used in the volume ratio of 0.5 to 5 based on the second extract solution.

The back extraction of the step (3) using the mixing of the second extract solution and the water may be carried out by putting the second extract solution and the water into a reactor and stirring the mixture intensely at room temperature. The stirring may be carried out for about 1 hour but not be limited to this. The stirring time may be appropriately adjusted. After completion of the stirring, the recovery solution as water containing the tellurium back-extracted from the second extract solution and the second extract solution as an organic phase may be left stationarily for phase separation, and then mutually separated from each other. The recovery solution may merely contain the almost pure tellurium. Consequently, a high purity tellurium metal may be produced from the recovery solution.

In the step (3), the second extract solution with the tellurium removed therefrom may be reused as the extractant of the step (1). With the series of processes carried out, the usage amount of the extractant may be minimized.

The tellurium separation method according to the present disclosure may economically recover tellurium as the high-priced metal at the excellent recovery ratio more than 95 percent by weight applying the simple solvent extraction, and also produce tellurium with high purity more than 99.9%.

Effect

A method for separating tellurium according to the present disclosure may separate and recover tellurium as a high-priced metallic element from a material, such as a $Bi_2Te_3$-based waste thermoelectric material, which contains not only the tellurium but also other metallic elements, simply and economically using a solvent extraction, whereby the tellurium with high yield and high purity can be separated, recovered and recycled.

DETAILED DESCRIPTION

Description will now be given in detail of the exemplary embodiments, such that a person skilled in the art to which the present disclosure belongs can easily execute the embodiments. However, the present disclosure may not be limited to the exemplary embodiment disclosed herein but implemented in various forms.

Example 1

(1) A $Bi_2Te_3$-based waste thermoelectric module, separated from a waste hot and cold water dispenser, was crushed into pieces with appropriate sizes and dissolved in a nitric acid solution to prepare a dissolved solution. Here, the content of each metallic element within the dissolved solution was shown in the following Table 1.

TABLE 1

| Metal | Bi | Te | Cu | Ni | Sn | Sb |
|---|---|---|---|---|---|---|
| Content(ppm) | 1,650 | 2,140 | 7,320 | 125 | 780 | 532 |

Hydrochloric acid was added into the dissolved solution to be at concentration of 4 mol/l within the solution, thereby preparing an extraction crude solution.

1 L of the extraction crude solution was put into a stirrer together with 5 L of an extractant as an organic phase, followed by a solvent extraction for 1 hour, thereby preparing a first extract solution. The extractant was prepared by diluting 2 L of tributyl phosphate (TBP) in 3 L of kerosene.

(2) After completion of the solvent extraction, a phase separation may be carried out between the first extract solution containing metallic elements and the extraction crude solution. 1 L of the first extract solution was poured into a stirrer together with 2 L of a hydrochloric acid solution, in which a concentration of the hydrochloric acid is 1 mol/l. A back extraction for the mixture was carried out for 1 hour, thereby obtaining a second extract solution which impurities were removed from the first extract solution.

(3) 1 L of the second extract solution as an organic phase was poured into a stirrer together with 0.5 L of water to be stirred. The back extraction for the mixture was carried out for 1 hour, thereby obtaining a recovery solution as an aqueous solution containing tellurium (Te).

Metallic elements contained in the recovery solution were analyzed using an ICP spectrophotometer (Perkin Elmer, Model: Optima 5300 DV), and the analysis results were shown in Table 2. It was observed that 98.1 percent by weight of tellurium was eventually recovered based on tellurium contained within the initial dissolved solution, and purity of the tellurium contained in the recovery solution was 560/(0.1+560+0.3)=0.99928=99.928%.

TABLE 2

| Metal | Bi | Te | Cu | Ni | Sn | Sb |
|---|---|---|---|---|---|---|
| Content(ppm) | 0.1 | 560 | 0.3 | ND* | ND* | ND* |

A symbol * refers to not detected

Example 2

Separation and recovery of tellurium of Example 2 were carried out using the same dissolved solution as Step (1) of Example 1.

(1) An extraction crude solution was prepared by adding hydrochloric acid into the dissolved solution to be at concentration of 10 mol/l within the solution. 1 L of the extraction crude solution was poured into a stirrer together with 0.2 L of an extractant as an organic phase. Afterwards, a solvent extraction was carried out for 1 hour according to the same method as in Example 1, to prepare a first extract solution. Here, the extractant was prepared by diluting 0.1 L of tris(2-ethylhexyl) phosphate (TEHP) in 0.1 L of kerosene.

(2) After completion of the solvent extraction, a phase separation may be carried out between the first extract solution containing metallic elements and the extraction crude solution. 0.2 L of the first extract solution was poured into a stirrer together with 0.1 L of a hydrochloric acid solution, in which a concentration of the hydrochloric acid is 1 mol/l. A back extraction for the mixture was carried out for 1 hour, thereby obtaining a second extract solution that impurities were removed from the first extract solution.

(3) 0.2 L of the second extract solution as an organic phase was poured into a stirrer together with 0.1 L of water to be stirred. The back extraction for the mixture was carried out for 1 hour, thereby obtaining a recovery solution as an aqueous solution containing tellurium (Te).

Metallic elements contained in the recovery solution were analyzed using an ICP spectrophotometer (Perkin Elmer, Model: Optima 5300 DV), and the analysis results were shown in Table 3. It was observed that 95.0 percent by weight of tellurium was eventually recovered based on tellurium contained within the initial dissolved solution, and purity of the tellurium contained in the recovery solution was 3390/(0.8+3390+1.4+0.3+0.4)=0.99914=99.914%

TABLE 3

| Metal | Bi | Te | Cu | Ni | Sn | Sb |
|---|---|---|---|---|---|---|
| Content(ppm) | 0.8 | 3,390 | 1.4 | ND* | 0.3 | 0.4 |

A symbol * refers to not detected

Example 3

Separation and recovery of tellurium of Example 3 were carried out using the same dissolved solution as Step (1) of Example 1.

(1) An extraction crude solution was prepared by adding a hydrochloric acid into the dissolved solution to be at concentration of 4 mat within the solution. 1 L of the extraction crude solution was poured into a stirrer together with 5 L of an extractant as an organic phase. Afterwards, a solvent extraction was carried out for 1 hour according to the same method as in Example 1, to prepare a first extract solution. Here, the extractant was prepared by diluting 2.5 L of tributyl phosphate (TBP) in 2.5 L of tris(2-ethylhexyl) phosphate (TEHP).

(2) After completion of the solvent extraction, a phase separation may be carried out between the first extract solution containing metallic elements and the extraction crude solution. 1 L of the first extract solution was poured into a stirrer together with 2 L of a hydrochloric acid solution as a weak hydrochloric acid solution, in which a concentration of the hydrochloric acid is 0.1 mol/l. A back extraction for the mixture was carried out for 1 hour, thereby obtaining a second extract solution that impurities were removed from the first extract solution.

(3) 1 L of the second extract solution as an organic phase was poured into a stirrer together with 0.5 L of water to be stirred. The back extraction for the mixture was carried out for 1 hour, thereby obtaining a recovery solution as an aqueous solution containing tellurium (Te).

Metallic elements contained in the recovery solution were analyzed using an ICP spectrophotometer (Perkin Elmer, Model: Optima 5300 DV), and the analysis results were shown in Table 4. It was observed that 96.3 percent by weight of tellurium was eventually recovered based on tellurium contained within the initial dissolved solution, and purity of the tellurium contained in the recovery solution was 550/(0.2+550+0.3)=0.99909=99.909%.

TABLE 4

| Metal | Bi | Te | Cu | Ni | Sn | Sb |
|---|---|---|---|---|---|---|
| Content(ppm) | 0.2 | 550 | 0.3 | ND* | ND* | ND* |

A symbol * refers to not detected

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for separating tellurium, comprising a procedure of separating and recovering tellurium from a solution containing the tellurium with a solvent extraction by an extractant, tris(2-ethylhexyl) phosphate (TEHP).

2. The method of claim 1, wherein the solution contains hydrochloric acid.

3. The method of claim 1, wherein the solvent extraction comprises steps of:
   (1) preparing an extraction crude solution by mixing hydrochloric acid with the solution and mixing the extraction crude solution with the extractant as an organic phase so as to prepare a first extract solution containing metallic elements extracted from the solution;
   (2) mixing the first extract solution with a hydrochloric acid solution to prepare a second extract solution as an organic phase, wherein impurities are removed from the first extract solution; and
   (3) mixing the second extract solution with water to prepare a recovery solution as an aqueous solution containing tellurium (Te).

4. The method of claim 3, wherein in the step (1), the hydrochloric acid is mixed such that a concentration of the hydrochloric acid is in a range of 4 to 10 mol/l within the extraction crude solution.

5. The method of claim 3, wherein in the step (1), the extractant is used in a volume ratio of 0.2 to 5 based on the extraction crude solution.

6. The method of claim 3, wherein in the step (2), the hydrochloric acid solution contains the hydrochloric acid at a concentration of 0.1 to 1 mol/l.

7. The method of claim 3, wherein in the step (2), the hydrochloric acid solution is used in a volume ratio of 0.5 to 2 based on the first extract solution.

8. The method of claim 3, wherein in the step (3), the water is used in a volume ratio of 0.5 or more based on the second extract solution.

9. The method of claim 1, wherein the extractant further contains a diluent, wherein the diluent is an organic solvent which is one selected from the group consisting of kerosene, hexane, benzene, toluene and combinations thereof.

10. The method of claim 1, wherein the solution is obtained by dissolving a $Bi_2Te_3$-based waste thermoelectric material in a strong acid.

11. The method of claim 10, wherein the strong acid is one selected from the group consisting of hydrochloric acid, nitric acid, and combinations thereof.

12. The method of claim 3, wherein in the step (3), the second extract solution with the tellurium removed therefrom is recycled as the extractant of the step (1).

13. A method for separating tellurium, comprising:
   mixing a solution containing tellurium with hydrochloric acid to prepare an extraction crude solution;
   mixing the extraction crude solution with an extractant comprising tris(2-ethylhexyl) phosphate by violently stirring at room temperature to prepare a first extract solution, wherein the extractant is in a volume ratio of 0.2 to 5 based on the extraction crude solution;

mixing the first extract solution with a hydrochloric acid solution by violently stirring to prepare a second extract solution, wherein the hydrochloric acid solution contains the hydrochloric add at a concentration of 0.1 to 1 mol/l; and mixing the second extract solution with water to prepare a recovery solution as an aqueous solution containing tellurium.

14. The method of claim 13, wherein the solution containing tellurium is obtained by dissolving a $Bi_2Te_3$-based waste thermoelectric material in a strong acid.

15. The method of claim 13, wherein the solution containing tellurium further contains hydrochloric acid.

16. The method of claim 13, wherein the extractant further contains a diluent, wherein the diluent is an organic solvent which is one selected from the group consisting of kerosene, hexane, benzene, toluene and combinations thereof.

17. The method of claim 14, wherein the strong acid is one selected from the group consisting of hydrochloric acid, nitric acid, and combinations thereof.

* * * * *